Nov. 17, 1925.
G. O. CASE
1,562,291
ROADWAY, PAVING BLOCK, AND THE LIKE
Filed Sept. 7, 1923
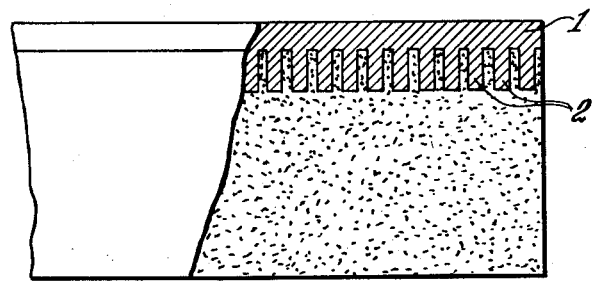
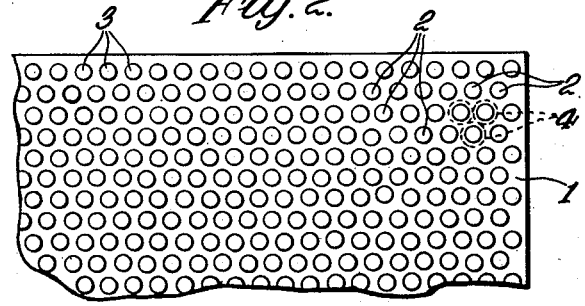
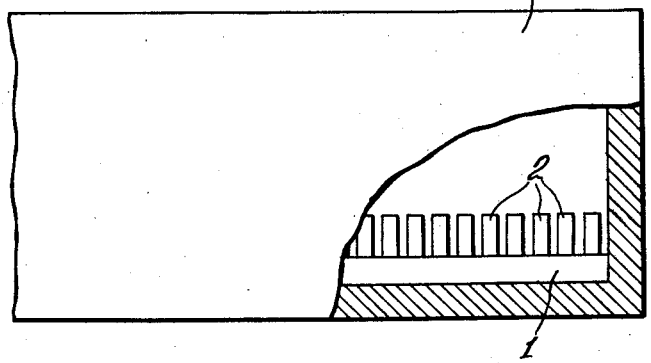
INVENTOR
GERALD OTLEY CASE.
per: Sydney E Page.
ATTORNEY.

Patented Nov. 17, 1925.

1,562,291

UNITED STATES PATENT OFFICE.

GERALD OTLEY CASE, OF LONDON, ENGLAND, ASSIGNOR TO RUBACRETE LIMITED, OF LONDON, ENGLAND.

ROADWAY, PAVING BLOCK, AND THE LIKE.

Application filed September 7. 1923. Serial No. 661,524.

*To all whom it may concern:*

Be it known that I, GERALD OTLEY CASE, a subject of the King of Great Britain, residing at 7-8 Idol Lane, Great Tower Street, London, E. C. 3, England, have invented certain new and useful Improvements in Roadways, Paving Blocks, and the like, of which the following is a specification.

This invention relates to improvements in or relating to paving material, for example, paving blocks, more particularly for the construction of roadways, pavings, and such-like: though mentioned as relating to paving blocks, the invention also relates to large surfaces in which rubber sheeting is required to be attached to a supporting surface, for example, for courts or other surfaces for playing games, in domestic architecture, and generally in any cases where it is desired that a rubber surface should be attached to a supporting surface, such for example, as concrete.

In the making of such articles as blocks for roadways, or roadways with large surfaces covered with rubber, it has been found that failure usually occurs due to considerable flat surfaces of rubber being pressed against corresponding surfaces of concrete or otherwise, and wear occurring not so much on the top surface of the rubber as on the concrete due to the frictional rubbing between the layers. Attempts have been made to avoid this rubbing action by vulcanizing the lower layer of the rubber top, in order to render it comparatively hard.

The object of this invention is to obviate failure due to rubbing, and especially to ensure that in dealing with materials composed of rubber in association with mineral surfaces, frictional wear is prevented in a simple manner.

It has heretofore been proposed where a rubber layer is associated with concrete, to provide studs or projections of a kind which are pressed into the concrete while plastic, but so far as I am aware, this has only been suggested where considerable areas of concrete are left between the projections, which I have found by experiment is a serious defect.

According to this invention, in carrying out the association of the rubber layer with the concrete support, I provide pins or similar projections (preferably circular in cross-section) formed beneath and integrally with the rubber layer, which directly enter the substance of the concrete, but distinguished by the feature that at the definite joint between the main rubber surface and the main cement or concrete surface there should be about the same area of rubber pins entering the concrete as there is of unperforated concrete, the distribution of the pins being limited by the fact that the area of rubber layer overlying the top surface of the concrete shall be such that it will prevent any possibility of the rubbing of the rubber on the concrete due to the passage of vehicles, or otherwise, so that the friction between the surfaces thereby engendered wears the concrete.

The concrete is set in air in order to take advantage of the important condition that when setting in air the cement shrinks and each pin is thus securely gripped when the cement finally sets.

In practice this resolves itself into having the pins or the like of rubber of small area close together, with the governing consideration that they shall not be so small that the action to which they are subjected shears the pins from the rubber layer, this consideration being combined with the condition that sufficiently reduced areas between the rubber projections are present to prevent friction, due to traffic causing wear at the dividing level.

I am aware that it has previously been proposed to construct a pavement wherein tiles of rubber are provided with an integral stud or studs by tapping them into a layer of cement while the latter is in a plastic condition, but I point out that it is exceedingly doubtful if it is practicable to get the cement in such a case to grip the said studs satisfactorily, and the rubber would certainly need to be held under pressure therein for some considerable time while the concrete sets; in any case, so far as I am aware, it has not previously been proposed to reduce the area of concrete between the studs to such an extent as to reduce the possibility of frictional wear at the contacting surfaces, which is a condition of great importance.

It should be understood that cement and concrete are used herein as synonymous terms, and depend merely on the particular mixture employed in particular cases.

The accompanying drawings illustrate the invention:

Fig. 1 is a view partly in section showing a layer of rubber provided with the projecting pins in elevation and attached to a block of concrete;

Fig. 2 is a plan of the rubber layer from the under side, showing the pins in plan; and Fig. 3 illustrates a method of producing paving blocks in a mould.

Referring to the drawings, Fig. 1 is a section through a block, showing the attachment of the rubber layer 1 by means of its projecting pins 2.

Fig. 2 is a plan of a portion of the rubber layer 1 viewed from the under side with round pins 2 standing out, and approximately this view shows—full size—pins of the smaller dimension mentioned hereinafter. The relative area of the rubber in these pins, in plan, is about three-eighths of the total area of the rubber layers, that is, when finally attached to the cement or concrete base, there would be about three-eighths of entering rubber to five-eighths of cement surface where the rubber and cement surfaces meet, the distribution of the cement surface being such that there will be no considerable area at the dividing level which will allow of the rubber layer being rubbed on the cement surface.

In certain cases it may be desirable to make the outer line 3 of rubber pins somewhat larger than the innermost pins, as it is required that these should be as near as possible to the edges of the block and rather more strain on the rubber pins will possibly take place at the edges of the block than in the middle.

In regard to the construction of the pins 2, it should be noted that the layer 1, with its pins attached, has first to be made before application to the base material, and usually the rubber facing must be made by casting it in a mould, or perhaps forcing it into a mould while the rubber is plastic. Careful consideration therefore must be given to getting the rubber layer out of its mould when formed, and one-sixteenth of an inch diameter is about the minimum limit at which the pins can be withdrawn from the mould, besides being about the minimum limit of size which will withstand the shearing action when traffic comes upon the roadway. In this connection the length of the pins is also of some importance, and preferably these should be made approximately three diameters in length.

By reference to the dotted circles 4 shown in Fig. 2, it will be seen that each pin is completely surrounded by the cement or concrete of the base, and it is due to the shrinkage of this cement when setting in air that each pin is securely gripped when the cement finally sets.

Since the shrinkage of the cement depends upon the state of atmosphere in which the setting takes place, it is advisable that the blocks should be formed under cover, and in Fig. 3 is illustrated a mould 5 suitable for casting a block, the rubber layer being first placed in the bottom of the mould and thereafter cement, for example, Portland cement, either mixed with sand or not, poured into the mould, which will eventually harden with the pins 2 firmly embedded therein. Casting in this way has the effect of keeping the densest layer of cement against the rubber layer, which is desirable, and unevenness of surface at the back of the combined block will be relatively unimportant.

In considering say, a block for a roadway carrying ordinary traffic, the size of the rubber projections which I find suitable is a diameter varying from about one-eighth of an inch to three-eighths of an inch, and, viewed in plan, with a proportional area of the rubber projections, varying between limits of about three-eighths to five-eighths of the total area of the layer to which they are attached, about half of the pin area to half of flat area being a useful average.

Since an essential part of the invention is the gripping of the pins by the concrete, it is found that with pins of the dimensions mentioned a distributed and effective attachment is obtained in view of the fact that the area of concrete at the dividing level is also reduced to a sufficient area, and owing to its shrinkage in setting, the pins are tightly and sufficiently gripped, even though formed with parallel sides.

While the best proportions of the pins for normal traffic are set out, it should be understood that in certain circumstances pins of a slightly smaller, or of a larger size may be employed, for example, where light traffic only is using the surface, or where a larger amount of flexibility of the surface is desirable, subject still, however, to the governing consideration that each pin should be surrounded by the cement layer, which should be of small area in proportion in order that there shall be no extended rubber to cement contacts at the dividing level, and in order to take advantage of the contracting character of the cement when setting in air.

By reason of the formation of the numerous rubber points and the small area of cement between them, a composite block may be produced with very good adhesive qualities between the layers. Cement of ordinary character may be used in this connection, but I may also use cement with particular adhesive qualities in certain cases of difficult application.

I claim:—

1. In roadways and blocks for roadways and paving purposes, in combination, a rubber layer and a foundation of cement, or the like, to which the said rubber layer is attached, and means for attaching, comprising numerous pins of relatively small cross sectional area integral with the rubber layer, and of a length substantially greater than their largest width, each pin being completely surrounded by the said cement, and being equally spaced apart in the said cement in such a manner that the area viewed in plan of the said pins and the area of the unperforated foundation is approximately the same, whereby both shearing of the pins and creeping, or rising of the layer are prevented.

2. In roadways and blocks for roadways and paving purposes, in combination, a rubber layer and a foundation of cement, or the like, to which the said rubber layer is attached, and means for attaching, comprising numerous pins of relatively small cross sectional area integral with the rubber layer, and of a length at least three times their largest width, each pin being completely surrounded by the said cement, and being equally spaced apart in the said cement in such a manner that the area viewed in plan of the said pins and the area of the unperforated foundation is approximately the same, whereby both shearing of the pins and creeping of the layer are prevented.

3. In roadways and blocks for roadways and paving purposes, in combination, a relatively thin rubber layer and foundation of cement or the like to which said rubber layer is attached, and means for attaching said layers comprising numerous pins within limits of from one-eighth to three-eighths of an inch diameter and of a length substantially greater than the said diameter and integral with the rubber layer, each pin being completely surrounded by the cement, and the number of said pins and their disposition in the cement, or equivalent foundations being such that the areas of unperforated foundation lying between the pins are small, substantially as described and for the purpose specified.

4. In roadways and blocks for roadways and paving purposes, in combination, a relatively thin rubber layer and foundation of cement or the like to which said rubber layer is attached, and means for attaching said layers comprising numerous pins within the limits of from one-eighth to three-eighths of an inch diameter and of a length substantially greater than the said diameter and integral with the rubber layer, and occupying an area of from three-eighths to five-eighths of the total area of the underside of the rubber layer, the number of the said pins and their disposition in the cement or equivalent foundation being such that the areas of unperforated foundation lying between the pins are small around each pin.

5. A relatively thin rubber pad or layer for use in making blocks for roadways and paving purposes, having numerous rubber pins within the limits of from one-eighth to three-eighths of an inch diameter and of a length substantially greater than the said diameter projecting from one side integrally with the whole rubber layer and occupying an area of from three-eighths to five-eighths of the total area of the rubber layer.

6. A relatively thin rubber pad or layer for use in making blocks for roadways and paving purposes, having means thereon for attaching the layer to a foundation comprising numerous pins of relatively small cross sectional area integral with the rubber layer, and of a length substantially greater than their largest width, each pin being equally spaced apart in such manner that the areas viewed in plan of the said pins and the areas of the spaces between the pins is approximately the same.

In testimony whereof I affix my signature.

GERALD OTLEY CASE.